United States Patent [19]

Kim

[11] Patent Number: 5,681,049
[45] Date of Patent: Oct. 28, 1997

[54] PORTABLE WHEELCHAIR

[76] Inventor: Il Yoo Kim, 7945 Audubon Ave. No. A-6, Alexandria, Va. 22306

[21] Appl. No.: 517,605

[22] Filed: Aug. 22, 1995

[51] Int. Cl.$^6$ .................................................. B62M 1/14
[52] U.S. Cl. .................. 280/250.1; 280/650; 297/DIG. 4
[58] Field of Search .................................. 280/250.1, 638, 280/639, 642, 647, 650; 297/DIG. 4

[56] References Cited

U.S. PATENT DOCUMENTS

| 970,291 | 9/1910 | Baisden | 301/5.7 |
|---|---|---|---|
| 3,381,973 | 5/1968 | Carr | 280/30 |
| 4,280,716 | 7/1981 | Bonsbaek et al. | 280/650 X |
| 4,462,605 | 7/1984 | Morgan et al. | 280/250.1 |
| 4,593,929 | 6/1986 | Williams | 280/650 |
| 4,770,432 | 9/1988 | Wagner | 280/250.1 |
| 4,813,693 | 3/1989 | Lockard et al. | 280/650.1 X |
| 4,887,826 | 12/1989 | Kantner | 280/250.1 |
| 5,071,196 | 12/1991 | Sbarro | 301/5.1 |
| 5,261,684 | 11/1993 | Soto | 280/250.1 |
| 5,480,172 | 1/1996 | James | 280/250.1 |
| 5,542,690 | 8/1996 | Kozicki | 280/304.1 |
| 5,568,933 | 10/1996 | Mizuno | 280/650 X |

OTHER PUBLICATIONS

Publication: *Popular Mechanics*, Wheelchair Disclosure, Oct. 1995, p. 28.

*Primary Examiner*—Kevin Hurley
*Attorney, Agent, or Firm*—Aquilino & Welsh

[57] ABSTRACT

A portable wheelchair including a seat assembly having a seat and a back rest, as well as a footrest having at least one guiding wheel. The seat assembly and the footrest are selectively secured between a first wheel and a second wheel, the first wheel including a first tire mounted on a first rim and the second wheel including a second tire mounted on a second rim. The seat assembly is secured to the first wheel by a first cross-brace and the seat assembly is secured to the second wheel by a second cross-brace. The first cross brace is coupled to the first wheel by a first bearing assembly slidably mounted to the first rim and a second bearing assembly slidably mounted to the first rim, wherein the first bearing assembly and the second bearing assembly are connected by a first spoke member. The second cross brace is coupled to the second wheel by a first bearing assembly slidably mounted to the second rim and a second bearing assembly slidably mounted to the second rim, wherein the first bearing assembly and the second bearing assembly are connected by a second spoke member.

19 Claims, 3 Drawing Sheets

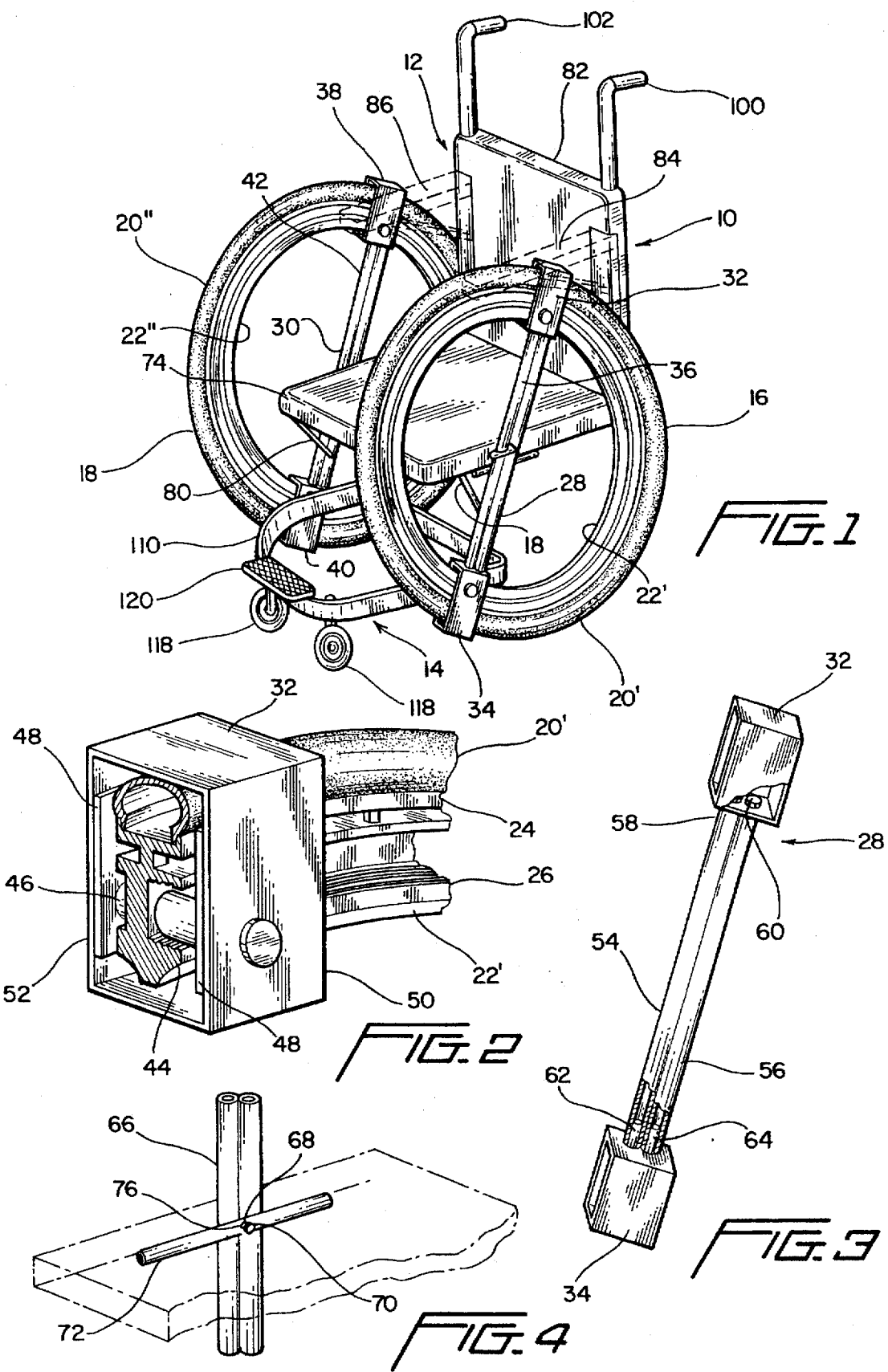

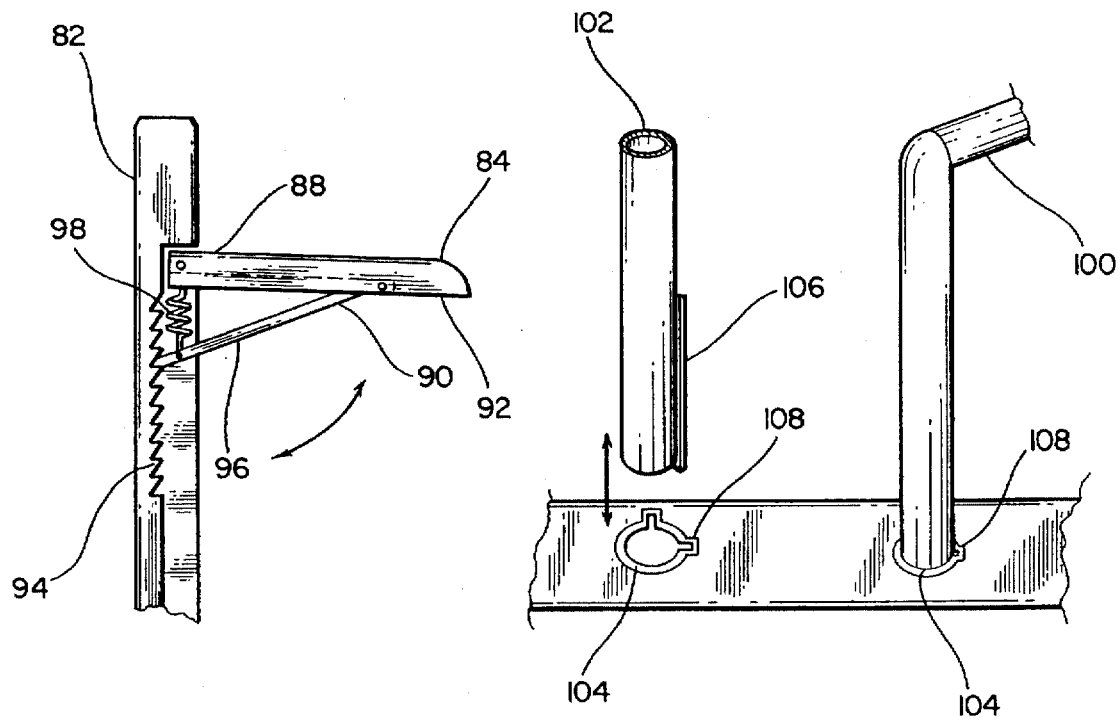
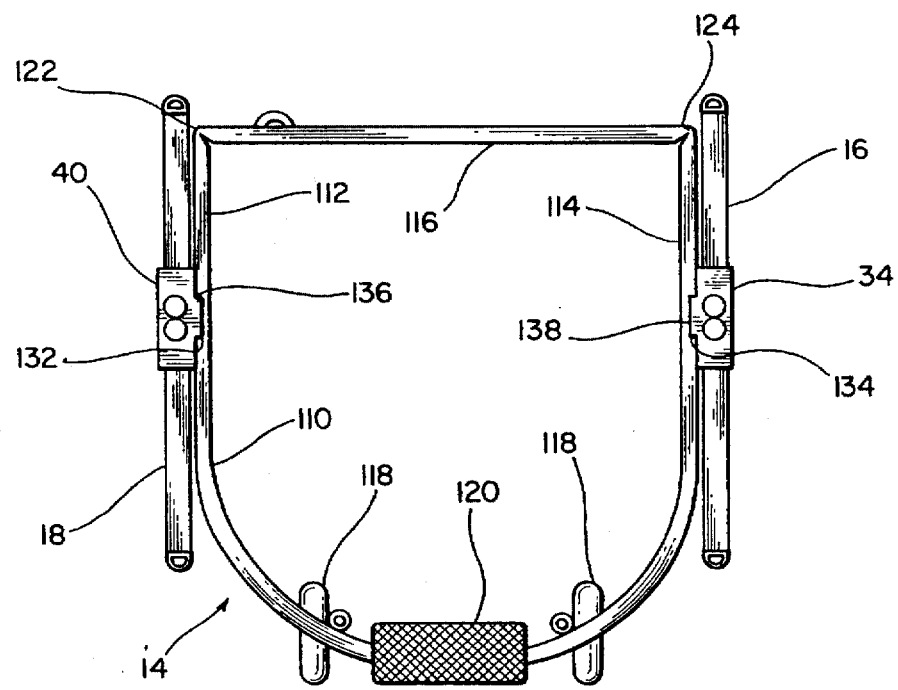

5,681,049

PORTABLE WHEELCHAIR

BACKGROUND OF THE INVENTION

1. Field of the Invention

The invention relates to a wheelchairs. More particularly, the invention relates to portable wheelchairs adapted for simple assembly and disassembly.

2. Description of the Prior Art

Conventional wheelchairs generally include a seat, a backrest, and a footrest rigidly secured to a pair of wheels. These wheelchairs are collapsed by pushing the wheels toward each other while the seat, backrest, and footrest collapse to the extent they are able to. As is well known to individuals familiar with these wheelchairs, they are generally, very cumbersome to transport or store, even when they are in their collapsed state.

Recent advances in design techniques and materials has made the development of lightweight, portable wheelchairs possible. The recent development of lightweight, portable wheelchairs has been met with great anticipation by individuals confined to wheelchairs, who had to previously deal with the limitations of heavier, more cumbersome wheelchairs.

However, recent developments in lightweight wheelchairs have produced relatively complex wheelchairs, which are not as easy to use as most individuals would like. For example, U.S. Pat. No. 5,261,684, to Soto, discloses a portable, lightweight wheelchair. The wheelchair includes a seat and footrest secured between a pair of spokeless wheels. The wheelchair is stored by disassembling the wheels, seat and footrest. The disassembly and assembly process is, however, complicated, and relies upon a variety of complex connections to retain the wheelchair in its assembled configuration.

Consequently a need continues to exist for a lightweight, portable wheelchair that may be readily assembled and disassembled. The present invention provides such a wheelchair.

SUMMARY OF THE INVENTION

It is, therefore, an object of the present invention to provide a portable wheelchair including a seat assembly having a seat and a back rest, as well as a footrest having at least one guiding wheel. The seat assembly and the footrest are selectively secured between a first wheel and a second wheel, the first wheel including a first tire mounted on a first rim and the second wheel including a second tire mounted on a second rim. The seat assembly is secured to the first wheel by a first cross-brace and the seat assembly is secured to the second wheel by a second cross-brace. The first cross brace is coupled to the first wheel by a first bearing slidably mounted to the first rim and a second bearing slidably mounted to the first rim, and the first bearing and the second bearing are connected by a first spoke member. The second cross brace is coupled to the second wheel by a first bearing slidably mounted to the second rim and a second bearing slidably mounted to the second rim, and the first bearing and the second bearing are connected by a second spoke member.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a perspective view of the present wheelchair.

FIG. 2 is a detailed view of the bearing assembly.

FIG. 3 is a partial cross-sectional view of the cross-brace.

FIG. 4 is a top view of the seat assembly connected to the second cross-brace.

FIG. 5 is a side view of the backrest showing the operation of the armrest.

FIG. 6 is a top view of the backrest.

FIG. 7 is a top view showing the detailed construction of the footrest as attached to the cross-braces.

DESCRIPTION OF THE PREFERRED EMBODIMENTS

Figure 8:
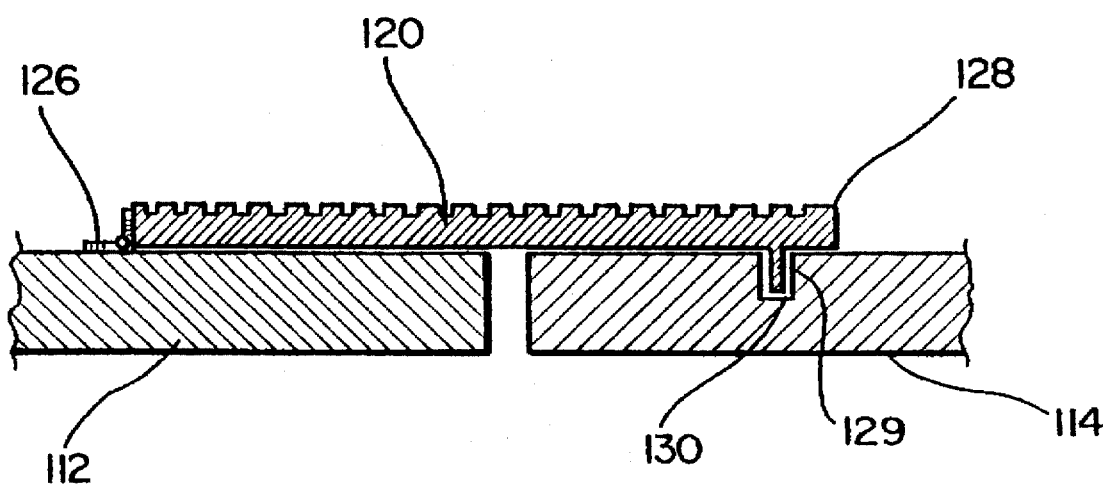
FIG. 8 is a front cross-sectional of the footrest showing the connection of the arms in detail.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIG. 1, a portable wheelchair 10 is disclosed. The wheelchair includes a seat assembly 12 and a footrest assembly 14 positioned between a first wheel 16 and a second wheel 18. Each wheel includes a tire 20 mounted on a spokeless rim 22. The rim 20 includes an outer groove 24 designed to retain the bead of the tire 18 and an inner bearing surface 26. Each rim 22 may further include an opening (not shown) permitting inflation of the tire. A cross-brace 28, 30 is secured across each wheel.

With regard to the first wheel 16, the first cross-brace 28 is coupled to the first wheel 16 and includes a first bearing assembly 32 slidably mounted to the first rim $22^1$ and a second bearing assembly 34 slidably mounted to the opposite side of the first rim $22^1$, wherein the first bearing assembly 32 and the second bearing assembly 34 are connected by a first spoke member 36. Similarly, the second cross-brace 30 is coupled to the second wheel 18 includes a first bearing assembly 38 slidably mounted to the second rim $22^{11}$ and a second bearing assembly 40 slidably mounted to the opposite side of the second rim $22^{11}$, wherein the first bearing assembly 38 and the second bearing assembly 40 are connected by a second spoke member 42.

The detailed construction of the first bearing assembly 32 of the first wheel 16 is shown in FIG. 2. It should be understood that all of the bearing assemblies are constructed the same, with the exception of spoke connection details that will be discussed below, and this disclosure of the first bearing assembly of the first wheel is applicable to the remaining bearing assemblies. The bearing assembly 32 is rectangular shaped and extends around a portion of the tire $20^1$ and the rim $22^1$. The bearing assembly 32 includes first and second bearing pins 44, 46 which extend toward the middle of the bearing assembly 32 and engage the bearing surface 26 of the rim $22^1$. The bearing assembly 32 further includes a pair of bearing plates 48 positioned on the side walls 50, 52 of the assembly. The bearing plates 50, 52 act to maintain the rim $22^1$ within the center of the bearing assembly 32.

As shown in FIG. 3, each spoke member is constructed from a pair of aluminum tubular members. It should be understood that FIG. 3 shows the first cross-brace 28 for the first wheel 16 in detail, however, the second cross-brace 30 for the second wheel 18 is identical in structure and function. The first and second tubular members 54, 56 are releasably attached to the first bearing assembly 32 and the second bearing assembly 34 of the first wheel 16.

Specifically, the first bearing assembly 32 includes first and second openings 58, 60 sized to respectively receive the upper ends of the first and second tubular members 54, 56, while the second bearing assembly 34 includes first and second detents 62, 64 sized to fictionally receive the lower ends of the first and second tubular members 54, 56. In use, the upper ends of the first and second tubular members 54, 56 are respectively passed into the first and second openings 58, 60 of the first bearing assembly 32. The first and second tubular members 54, 56 are pushed sufficiently within the openings 58, 60 to permit the lower ends of the first and second tubular members 54, 56 above the first and second detents 62, 64. The first and second detents 62, 64 are then respectively forced within the first and second tubular members 54, 56 until the first and second tubular member 54, 56 are frictionally held in position.

With reference to FIG. 4, the first tubular member 66 of the second cross-brace 30 of the second wheel 18 includes a first projection 68 with a quick release compression fastener 70. Although not shown, the first cross-brace 28 includes a similar projection and quick release fastener secured to the first tubular member 54 of the first cross-brace 28. The quick release compression fasteners are preferably of the type commonly used to secure bicycle tires to the bicycle frame, although other fasteners could be used without departing from the spirit of the present invention. The projections are used to securely attach the seat assembly between the wheels in a manner that will be discussed in more detail below.

The seat assembly 12 is releasably coupled between the first and second wheels 16, 18. With reference to FIG. 4, the attachment of the second cross-brace 30 to the seat assembly 12 is disclosed. It should be understood that the first cross-brace 28 is secured to the seat assembly 12 in the same manner. The seat assembly 12 includes a pair of downwardly extending brackets 72 (only the bracket adjacent the second cross-brace is shown) secured to the bottom of the seat 74. The bracket 72 includes an opening 76 sized to receive the first projection 68. Once the first projection 68 is properly positioned within the first bracket opening 76 the quick release pressure fastener 70 is twisted to securely attach the seat assembly 12 to the second wheel 18. The first wheel 16 is attached in the same manner.

The stability of the seat assembly 12 attachment to the first and second wheels is further enhanced by first and second support members 78, 80 which extend from the bottom of the seat 74. Specifically, the first support member 78 is pivotally secured to one side of the seat 74 while the second support member 80 is pivotally secured to the other side of the seat 74. The unattached ends of the first and second support members 78, 80 respectively engage notches (not shown) in the cross-braces 28, 30 to support the seat assembly 12 relative to the first and second wheels 16, 18.

As to the structure of the seat assembly 12, it includes a seat 74 and a backrest 82. Preferably, the seat 74 and the backrest 82 are hingedly connected so that the seat assembly 12 can be folded into a compact package when the wheelchair 10 is disassembled. The backrest 82 includes a pair of armrests 84, 86 on opposite sides of the backrest 82. The armrests 84, 86 are pivotally secure to the backrest 82 and may be selectively folded down when an individual desires. The operation of the armrests 84, 86 is shown in greater detail in FIG. 5. Specifically, the upper end 88 of each armrest is pivotally secured to the backrest 82. Each armrest includes a support bracket 90 pivotally mounted at a central portion on the underside 92 of the armrest, while the backrest 82 includes a series of notches 94 adapted to receive the unattached end 94 of the support bracket 90. When an individual desires to place the armrest in a useable orientation, he or she simply rotates the armrest upward and places the unattached end 96 of the support bracket 90 within a notch 94. The support bracket 90 includes a spring 98 secured at its distal end. The spring 98 aids in securely positioning the distal end of the support bracket 98 within a notch. This provides a well supported armrest that can readily be rotated to a storage position when an individual desires.

The backrest 82 also supports first and second push handles 100, 102. The push handles are secured to opposite side of the backrest 82. The push handles are secured to the backrest so that they are fully retractable. With reference to FIG. 6, the push handles 100, 102 are stored within openings 104 formed in the backrest 82 of the seat assembly 12. When an individual desires to retract the push handles 100, 102 for use, he or she simply pulls the push handles 100, 102 from within the openings 104. Once the push handles 100, 102 are properly withdrawn, they are rotated such that detents 106 move from alignment with slots 108 respectively positioned adjacent the openings 104. Similarly, the push handles 100, 102 are pushed back within the openings 104 by rotating the handles until the detents 106 are aligned with the slots 108. Once the detents 106 are aligned with the slots 108, the push handles 100, 102 will readily slide within the openings.

The footrest assembly 14 is shown in FIG. 7, and includes a U-shaped support member 110 having a pair of arms 112, 114 connected by a central portion 116. Guide wheels 118 are respectively secured adjacent the distal ends of the arms 112, 114. The guide wheels 118 are conventional caster wheels and are designed to permit a wide range of motion. Additionally, a footpad 120 is secured to the distal ends of the arms 112, 114 in a manner that will be discussed in greater detail.

As shown in FIG. 7, each arm includes an opening used for attaching the footrest assembly 14 to the first wheel 16 and the second wheel 18 in a manner that will be discussed in greater detail below. The footrest 14 includes a first hinge 122 located where the first arm 112 meets the central portion 116 and a second hinge 124 where the second arm 114 meets the central portion 116. The first hinge 122 is designed to permit the first arm 112 to rotate counter clockwise when viewed from above and the second hinge 124 is designed to permit the second arm 114 to rotate clockwise when viewed from above. The arrangement of the hinges permits the footrest 14 to be folded in the most efficient manner.

As mentioned above, a footpad 120 is secured to the distal end of the first and second arms 112, 114. As shown in FIG. 8, the footpad 120 is pivotally secured to the first arm 112 and releasably secured to the second arm 114. Consequently, the footpad 120 connects the distal ends of the arms 112, 114 when the footrest 14 is in use, but permits the arms 112, 114 to be folded when the footrest 14 is no longer needed. Specifically, a hinge 126 connects the footpad 120 to the first arm 112, while the distal end 128 of the footpad 126 includes a projection 129 which releasably engages an opening 130 in the distal end of the second arm 114.

The footrest assembly 14 is releasably connected to the second bearing assembly 34 of the first wheel 16 and the second bearing assembly 40 of the second wheel 18 by respectively placing projections 132, 134 of the second bearing assemblies 34, 40 within the openings 136, 138 formed in the arms 112, 114 of the footrest assembly. The projections 132, 134 are placed within the openings 136, 138 before the pressure fasteners 70 are twisted to secure the seat assembly 12 to the first and second wheels 16, 18. Consequently, when the pressure fasteners 70 are twisted to draw the first and second wheels 16, 18 securely toward the seat assembly 12, they also draw the projections 132, 134 securely within the openings 136, 138 of the footrest assembly 14 to releasably attach the footrest assembly 14 between the first and second wheels 16, 18.

When a user determines that he or she is through using the wheelchair and desires to store it in a compact space, the user simply disengages the seat assembly from the first wheel and the second wheel by releasing the pressure fasteners. This also results in the removal of the footrest assembly from between the first and second wheels. Once the seat assembly is removed the push handle are placed in their stored position within the openings found in the backrest, and the backrest and seat are folded toward each other. Similarly, the footrest assembly is folded along the first and second hinges. The spokes may also be detached. Once everything is disassembled the seat assembly, footrest assembly, and spokes may be positioned within the wheel openings for compact storage of the wheelchair. The disassembly steps are simply reversed when an individual once again requires the use of the wheelchair.

With the exception of the aluminum tubular members, the tires and the rims, all of the components of the present can be manufactured from high strength, lightweight plastic. As a result, the present wheelchair is fully portable and weighs only approximately 14 pounds. It should, however, be understood that are wide range of materials could be used without departing from the spirit of the present invention.

While the preferred embodiment has been shown and described, it will be understood that there is no intent to limit the invention by such disclosure, but rather, is intended to cover all modifications and alternate constructions falling within the spirit and scope of the invention as defined in the appended claims.

I claim:

1. A portable wheelchair, comprising:
   a seat assembly;
   a footrest including at least one guiding wheel;
   the seat assembly and the footrest selectively secured between a first wheel and a second wheel, the first wheel including a first tire mounted on a first rim and the second wheel including a second tire mounted on a second rim, wherein a first cross-brace releasably couples the seat assembly to the first wheel and a second cross-brace releasably couples the seat assembly to the second wheel;
   the first cross-brace is coupled to the first wheel by a first bearing assembly coupled to the first rim and a second bearing assembly coupled to the first rim, wherein the first bearing assembly and the second bearing assembly are connected by a first spoke member;
   the second cross-brace is coupled to the second wheel by a first bearing assembly coupled to the second rim and a second bearing assembly coupled to the second rim, wherein the first bearing assembly and the second bearing assembly are connected by a second spoke member.

2. The wheelchair according to claim 1, wherein the seat assembly includes a seat and a backrest.

3. The wheelchair according to claim 2, the seat and backrest are hingedly connected.

4. The wheelchair according to claim 2, the backrest includes a pair of retractable armrests.

5. The wheelchair according to claim 1, the seat assembly includes a pair of retractable push handles.

6. The wheelchair according to claim 1, wherein each spoke member includes a projection for releasably connecting each cross-brace to the seat assembly.

7. The wheelchair according to claim 1, wherein the second bearing assembly of the first rim and the second bearing assembly of the second rim each include a detent for connecting the first and second wheels to the footrest.

8. The wheelchair according to claim 1, wherein the footrest is foldable to a compact configuration.

9. The wheelchair according to claim 1, wherein the each spoke member includes a pair of tubular members.

10. The wheelchair according to claim 9, wherein each tubular member is releasably attached to the first bearing assembly and the second bearing assembly.

11. The wheelchair according to claim 1, wherein the first spoke member is releasably attached to the first bearing assembly and the second bearing assembly of the first wheel and the second spoke member is releasably attached to the first bearing assembly and the second bearing assembly of the second wheel.

12. The wheelchair according to claim 1, wherein the first bearing assembly and the second bearing assembly of the first wheel are slidably mounted to the first rim, and the first bearing assembly and the second bearing assembly of the second wheel are slidably mounted to the second rim.

13. The wheelchair according to claim 12, wherein the first rim includes a bearing surface which engages a first bearing pin in the first bearing assembly of the first cross-brace and a second bearing pin in the second bearing assembly of the first cross-brace; and the second rim includes a bearing surface which engages a first bearing pin in the first bearing assembly of the second cross-brace and a second bearing pin in the second bearing assembly of the second cross-brace.

14. The wheelchair according to claim 12, wherein the second bearing assembly of the first rim and the second bearing assembly of the second rim each include a detent for releasably connecting the first and second wheels to the to the footrest.

15. The wheelchair according to claim 12, wherein the each spoke member includes a pair of tubular members.

16. The wheelchair according to claim 15, wherein each tubular member is releasably attached to the first bearing assembly and the second bearing assembly.

17. The wheelchair according to claim 12, wherein the first spoke member is releasably attached to the first bearing assembly and the second bearing assembly of the first wheel and the second spoke member is releasably attached to the first bearing assembly and the second bearing assembly of the second wheel.

18. A portable wheelchair, comprising:
   a seat means for supporting an individual;
   a footrest means for supporting an individual, the footrest means including at least one guiding wheel;
   the seat means and the footrest means selectively secured between a first wheel and a second wheel, wherein first connecting means are provided for releasably connecting the seat means to the first wheel and second connecting means are provided for releasably connecting the seat means to the second wheel, the first connecting means including a first cross-brace coupled to the first wheel to extend between a first portion of the first wheel and a second portion of the first wheel and the second connecting means including a second cross-brace coupled to the second wheel to extend between a first portion of the second wheel and a second portion of the second wheel; and footrest connecting means for releasably connecting the footrest means between the first and second wheels.

19. The wheelchair according to claim 18, wherein the first cross-brace is coupled to the first wheel by a first bearing assembly slidably mounted to the first wheel and a second bearing assembly slidably mounted to the first wheel, wherein the first bearing assembly and the second bearing assembly are connected by a first spoke member, and the second cross-brace is coupled to the second wheel by a first bearing assembly slidably mounted to the second wheel and a second bearing assembly slidably mounted to the second wheel, wherein the first bearing and the second bearing are connected by a second spoke member.

* * * * *